Patented Oct. 18, 1932

1,882,777

UNITED STATES PATENT OFFICE

MOSES L. CROSSLEY AND MAURICE L. DOLT, OF PLAINFIELD, NEW JERSEY, ASSIGNORS TO THE CALCO CHEMICAL COMPANY, INC., OF BOUND BROOK, NEW JERSEY, A CORPORATION OF DELAWARE

NEW MORDANT

No Drawing. Application filed December 19, 1929. Serial No. 415,354.

This invention relates to new mordants having a very high mordanting power and to a process for making the same.

Although a standard of mordanting power known as "type" and based on a comparison with tannic acid has obtained commercial recognition, it has not yet, so far as we know, been included in scientific textbooks. Therefore, in order to define our new mordants with precision, we describe the test used to measure mordanting power on this basis:

Cotton is dyed with a basic dye solution using as a mordant a solution of tannic acid of the strength customarily used with that dye solution. Cotton is then dyed with the same dye solution with a solution of the mordant to be tested, and the strength of the mordanting solution is varied until the intensity of color obtained on the cotton is the same as that obtained with the use of the tannic acid mordanting solution. The strength of the solution of the mordant under test is then compared with the strength of the tannic acid mordanting solution. If these are the same, the mordanting power of the mordant tested is said to be equal to "type". But, if, for example, in such a test a two per cent solution of the mordant tested is found to produce the same effect as a four per cent solution of tannic acid, the mordanting power of the mordant tested is said to be two times "type".

Sulphurized phenol mordants heretofore produced (Thauss and Gunther Patent No. 1,450,463, Battegay Patent No. 1,523,340) are substantially insoluble in water and have a mordanting power about equal to "type".

The new mordants embodying our invention are alkali-metal salts of phenol-sulphur condensation products. They are distinguished from other sulphurized phenol mordants by the following properties:

Appearance: pearl gray powders.
Solubility: completely soluble in water at room temperature.
Mordanting power on cotton: from three to five times "type".

The new mordants possess great practical advantages over the former mordants, since they may be dissolved without the addition of any alkali to the dye solution, and since only relatively small quantities of them need be used owing to their high mordanting power. They have also the advantage of staining cotton fibres less than the former mordants.

The process by which the new mordants are produced consists of two parts. The first part is the forming of a phenol-sulphur condensation product by fusing and heating solid phenol and sulphur with a caustic catalyst and separating the condensation product from the excess phenol. The second part consists in making an alkali-metal salt of a condensation product by mixing it with a substantial proportion of alkali-metal caustic and fusing the condensation product and the caustic together, which causes a reaction to take place between them. It will be understood that the condensation product is essentially acid in reaction and that, since under the conditions described it reacts with the alkali caustic, the reaction product is herein termed a "salt" in the broad sense of that term, although its chemical composition is complex and cannot be exactly stated.

In the first part of the process, solid phenol and sulphur are most desirably used in the proportion of two molecules of phenol to 3½ atoms of sulphur. The catalyst may be any alkali-metal caustic. A very small amount, less than one per cent, of the caustic is sufficient to have the necessary catalytic action. The use of more than this amount is objectionable, since it is not desired that the caustic enter into the condensation product formed. The heating should be carried to a temperature in excess of 200° C. After the condensation product is formed, the excess phenol may be separated from it by vacuum distillation.

In the second part of the process, sufficient caustic should be used to neutralize the acidity of the condensation product and render it soluble. It is undesirable to use more caustic than is necessary to effect this purpose, as this results in the presence of free caustic in the final product. As a practical matter, the caustic should be equal to from twenty to thirty per cent by weight of the condensation product with which it is fused.

A specific example of the method is described in detail, for the sake of illustration:

Forty-eight parts of solid phenol are mixed with twenty-eight parts of sulphur and a small quantity of flaked caustic (NaOH) to serve as a catalyst. The amount of caustic used should be less than one per cent, and is most desirably about 0.6%. The mixture is placed in a vessel provided with a reflux condenser and heated until its ingredients are fused. This occurs at about 120° C. The mixture is then thoroughly stirred and its temperature raised gradually to 230° C., maintaining a uniform rate of reflux. It requires from four to five hours to reach this point. The temperature is then maintained at 230° C. for twelve hours. It is then raised gradually to about 245° C. and the excess phenol distilled off under vacuum. The condensation product which has been formed may then be allowed to cool and harden. The condensation product is broken up into small lumps and mixed with flaked caustic (NaOH) in amount equal to twenty-five per cent of the condensation product by weight. The condensation product and the caustic are mixed by grinding them together and the mixture heated gradually until it fuses. This occurs at about 100° to 110° C. When the mixture is fused a reaction takes place between the condensation product and the caustic. The fused product is allowed to cool until it becomes a hard brittle mass. This mass is then broken up and ground to a powder, producing the mordant whose mordanting power and other properties have been described.

The expression "alkali metal" as used in this specification and the claims which follow is to be understood to include the putative metal $NH_4$.

What is claimed is:

1. The hereindescribed alkali-metal salts of phenol-sulphur condensation products which are pearl gray powders soluble in water at room temperature and have a mordanting power on cotton from three to five times "type."

2. The hereindescribed alkali-metal salts of phenol-sulphur condensation products which are soluble in water at room temperature and have a mordanting power materially in excess of "type."

3. The process of making an alkali-metal salt of a phenol-sulphur condensation product, which comprises fusing together the condensation product and an alkali-metal caustic.

4. The process of making a mordant, which comprises fusing together a sulphur-phenol reaction product and an alkali-metal caustic amounting to from twenty to thirty per cent by weight of the condensation product to cause a reaction between the condensation product and the caustic, allowing the reaction product to solidify, and grinding it to a powder.

5. The process of making a mordant, which comprises fusing together a sulphur-phenol condensation product and caustic soda in the proportion of four to one by weight to cause a reaction between them, allowing the reaction product to solidify, and grinding it to a fine powder.

6. The process of making a mordant, which comprises heating a mixture of sulphur and phenol containing a small quantity of a caustic as a catalyst to form a sulphur-phenol condensation product, and fusing together said condensation product and a substantial proportion of alkali-metal caustic to form a soluble-alkali metal salt of the condensation product.

7. The process of making a mordant, which comprises heating a mixture of sulphur and phenol containing a small quantity of a caustic as a catalyst at a temperture of 200° C. to form a sulphur-phenol condensation product, and then fusing together said condensation product and a substantial proportion of caustic to cause a reaction between them.

8. The process of making a mordant, which comprises mixing solid phenol and sulphur substantially in the proportion of two molecules of phenol to 3½ atoms of sulphur with less than one per cent of caustic, fusing the mixture, maintaining it about its fusing temperature until a sulphur-phenol condensation product is formed, and fusing together this condensation product and a substantial proportion of caustic.

9. In a process of making a mordant, the steps of mixing solid phenol and sulphur in the proportion of two molecules of phenol to 3½ atoms of sulphur with a quantity not exceeding one per cent of caustic, fusing the mixture, maintaining it above its fusing temperature until a sulphur-phenol condensation product is formed, and separating the excess phenol from said product.

10. In a process of making a mordant, the steps of heating a mixture of sulphur and phenol containing a small quantity of a caustic as a catalyst to a temperature between 200° and 280° C. to form a sulphur-phenol condensation product, and separating the excess phenol from this product.

In testimony whereof we have hereunto set our hands.

MOSES L. CROSSLEY.
MAURICE L. DOLT.